Dec. 19, 1961   J. SERBIN   3,013,930
APPARATUS FOR CONNECTING OVERLAPPED ENDS OF A STRIP
Filed July 25, 1960   2 Sheets-Sheet 2
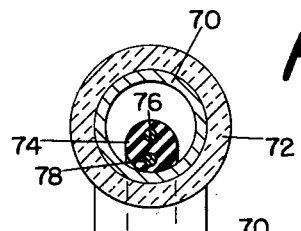
Fig. 2
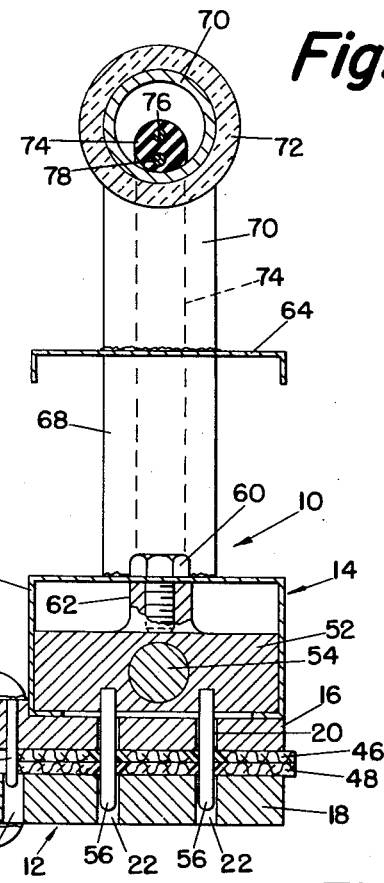
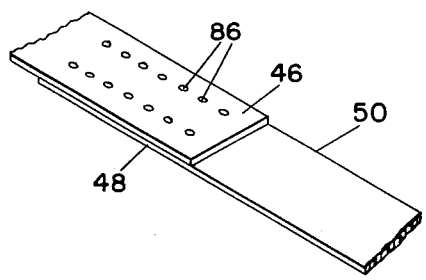
Fig. 3
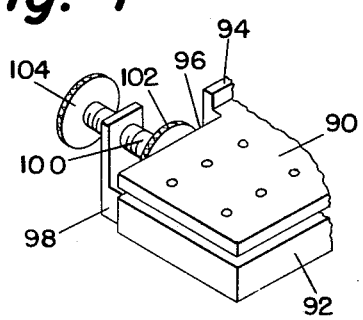
Fig. 4
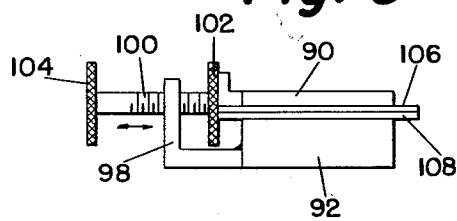
Fig. 5
INVENTOR.
JACOB SERBIN
BY
Caesar and Rivise
ATTORNEYS.

United States Patent Office 3,013,930
Patented Dec. 19, 1961

3,013,930
APPARATUS FOR CONNECTING OVERLAPPED ENDS OF A STRIP
Jacob Serbin, Philadelphia, Pa., assignor to Narricot Corp., Philadelphia, Pa., a corporation of Pennsylvania
Filed July 25, 1960, Ser. No. 45,029
3 Claims. (Cl. 156—581)

This invention relates to a method and apparatus for joining the ends of strips to form endless belts or tapes, and it more particularly relates to a method and apparatus for forming a permanent bond between the ends in a rapid and efficient manner.

This application is a continuation-in-part of applicant's prior application Serial Number 738,749, filed May 29, 1958, now abandoned.

Endless tapes, when made of a synthetic polyester fiber such as "Dacron," are widely used, especially in the commercial automatic laundry business, for driving automatic continuous ironers, mangles, conveyors, etc.

Heretofore, it was the practice to join the ends of the tapes by means of adhesive, sewing, stapling or tying. However, with the heavy use and high temperature conditions to which the tapes are subjected in the aforementioned laundry field, these methods of joining the ends were extremely ineffective. For example, operating temperatures in the laundry often reach as high as 325° F. When subjected to such temperatures, the adhesive becomes ineffective and the bond is broken.

Insofar as concerns the other prior fastening methods, the stitches, staples or knot became loosened or undone within a matter of a few hours or, at most, a few days. Furthermore, the stitches, staples or knots produced bulges on the surface of the tapes which caused jumping and wobbling of the tapes as they ran over the supporting pulleys or rollers.

It is one object of the present invention to overcome the various disadvantages of the prior art by providing a connection between the ends of tapes or the like which is quickly and easily produced, which requires no special skill, and which is effective at very high temperatures.

Another object of the present invention is to produce an endless tape or the like which is provided with securely connected ends which will not be disengaged from each other regardless of the severity of the conditions of use to which the tape is put.

Another object of the present invention is to produce an endless tape having a bond between its ends which is formed of the same material as the tape itself so that the bond is effective under all conditions at which the tape itself is effective.

Another object of the present invention is to produce an endless tape of the aforesaid type which is free from bulges and projections which would interfere with the smooth operation thereof.

Other objects and many of the attendant advantages of this invention will be readily appreciated as the same becomes better understood by reference to the following detailed description when considered in connection with the accompanying drawings wherein:

FIG. 2 is a fragmentary sectional view taken substantially on line 2—2 of FIG. 1, but showing the parts in the operative position;

FIG. 3 is a fragmentary, top perspective view of a junction area formed by the apparatus of FIGS. 1 and 2;

FIG. 4 is a fragmentary, top perspective view of a modified form of apparatus embodying the present invention; and FIG. 5 is an end view of the device of FIG. 4.

Figure 1:
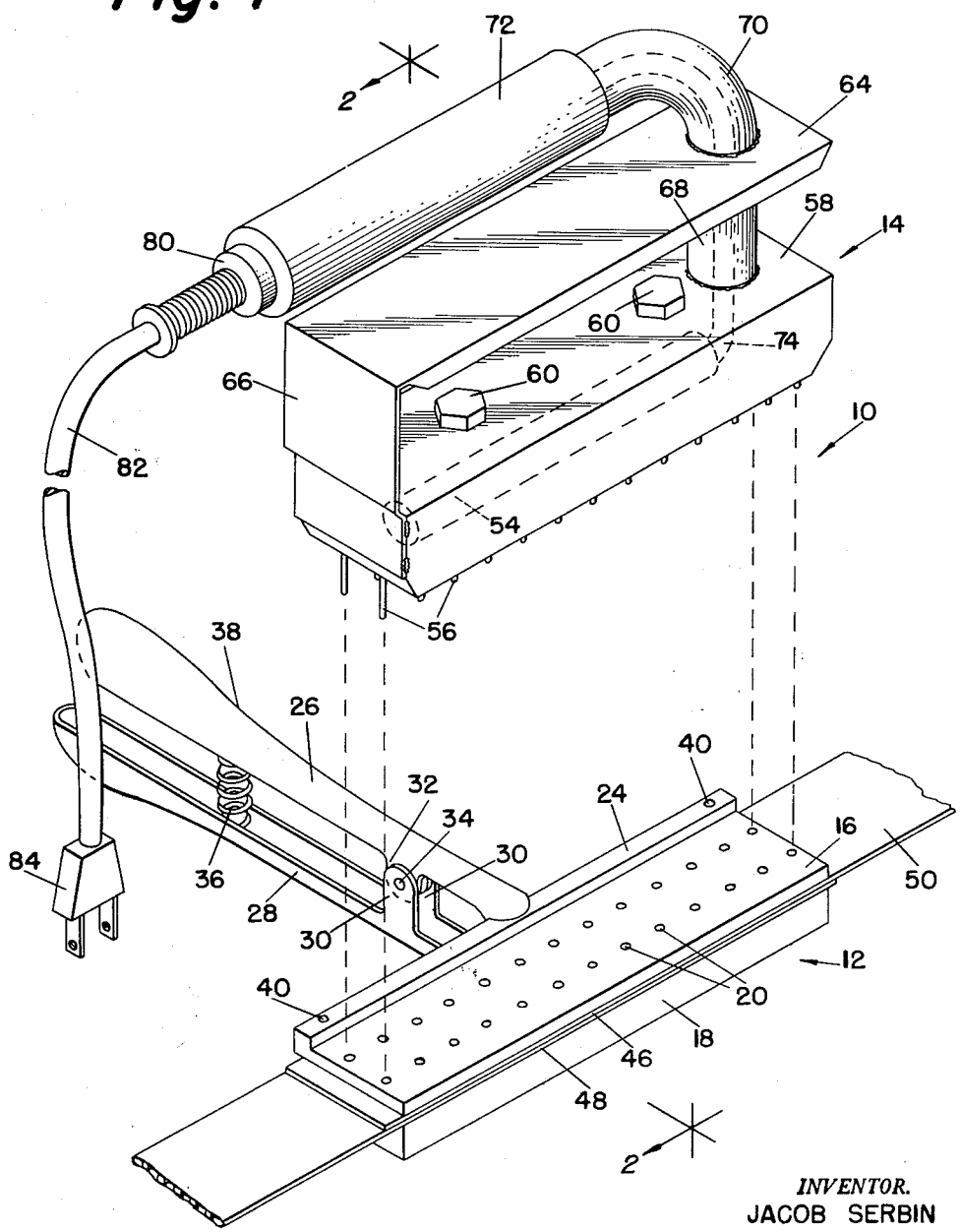
FIG. 1 is a top perspective view of an apparatus embodying the present invention, the parts being shown in the spaced inoperative position.

Referring now in greater detail to the various figures of the drawings wherein similar reference characters refer to similar parts, there is shown a sealing apparatus, generally designated 10, comprising a clamp member 12 and a heating iron 14.

The clamp member 12 comprises a pair of plates 16 and 18, each being provided with a plurality of holes preferably arranged in rows. The holes in the plate 16 are designated 20 while the holes in the plate 18 are designated 22. The holes 20 and 22 are arranged to be aligned with each other when their corresponding plates are in the closed position (as shown in FIGS. 1 and 2).

The rear edge of plate 16 is provided with an upstanding flange 24 to the center of which is connected, as by welding, riveting, bolting or any other manner desired, one end of a channel arm 26. The plate 18 is similarly connected at the center of its rear edge to a channel arm 28. The arm 28 is provided with a pair of upstanding ears 30 adjacent to but spaced from the rear edge of the plate 18 and to these ears 30 are pivotally secured a pair of ears 32 depending from arm 26. A pivot pin 34 holds the ears in pivotal connection with each other.

Spaced from the pivotal connection between the arms is a coil spring 36 which extends between the arms and acts to urge the arms away from each other, thereby urging the plates 16 and 18 toward each other.

The arms 26 and 28 plus their pivotal connection and biasing spring form the manipulating handle which, as a whole, is designated 38.

The flange 24 on the plate 16 is provided with a pair of holes 40, one adjacent each end. In each of these holes 40 is positioned a pin 42 (see FIG. 2) which depends from the bottom of the plate 16 and is adapted to be received in holes 44 in the plate 18 when the plates 16 and 18 are in closed position. These pins 42 serve as guide means to prevent lateral displacement of the overlapped end portions 46 and 48 of a tape 50 when these end portions are inserted between the clamping plates.

The heating iron 14 comprises a block 52 of heat conducting material having an electrical heating element 54 therein. Depending from the block 52 are a plurality of pins 56 corresponding in number and arrangement to the mating holes 20 and 22 and adapted to be inserted within those mating holes when the plates 16 and 18 are in clamped position and the iron 14 is brought into conjunction therewith (as in FIG. 2).

A casing 58 encloses the block 52 and is held thereon by bolts 60 extending through corresponding apertures in the top wall of the casing 58 and into corresponding hollow bosses 62 extending up from the top of the block 52.

A guard plate or canopy 64 overlies the casing 58 in spaced relation thereto and is secured thereto at one end by a flange 66. The canopy is provided to prevent inadvertent touching of the iron by the hands of the user. Adjacent the opposite end, there is provided an upstanding tube 68 which extends through the canopy and is provided with an elbow portion 70 above the canopy. The elbow portion 70 leads into a hollow handle 72 constructed of electrical and heat insulating material. An electrical cable 74, containing conducting wires 76 and 78 therein, leads from the heating element 54 through the tube 68 and elbow portion 70 and through handle 72 to an electrical connector 80. The plug 80 is provided with an electrical cable 82 having a plug 84 at its free end.

In operation, the end portions 46 and 48 of a tape 50 are overlapped and these overlapped portions are clamped between the plates 16 and 18 so that the holes 20 are aligned with the holes 22. While holding the handle 38 in one hand, the other hand is used to grasp the handle 72 and bring the iron 14, which is plugged into an electrical outlet, down onto the clamping assembly so that the pins 56 enter into the holes 20 and pierce the overlapping portions of the tape as they enter holes 22 to form holes 86 in the tape.

The pins 56, being above the melting temperature of the material forming the tape, act to melt the surrounding areas of the overlapped portions of the tape. This melted material of both overlapped portions flows together to form a unitary, cohesive rim wall around each hole.

When the heated pins are withdrawn, the melt forming the rim wall of each hole 86 hardens and sets to form integral bonds between the two overlapped portions. These bonds are at least as strong as the tape itself so that there is thereafter never any danger that the ends will come apart before the tape itself regardless of the conditions of use. Furthermore, the bonds formed by the holes 86 do not project beyond either surface of the overlapped portions so that no bulges or abutments are present to interfere with the efficient operation of the web.

In FIGS. 4 and 5, there is shown a modified form of the clamping device wherein the plates 90 and 92 are substantially identical to plates 16 and 18 except that the flange 94 on plate 90, corresponding to flange 24, terminates short of each end to provide recesses 96. At the same area, the plate 92 is provided with bracekts 98 having threaded apertures through which extend screw-threaded shafts 100. At the inner end of each shaft 100 is provided a disc or head 102 while at the outer end is a knurled finger-actuated knob 104.

The heads 102 serve as guides to prevent lateral movement of the overlapped tape portions 106 and 108 clamped between the plates 90 and 92. In this manner they serve the same purpose as pins 42. However, unlike pins 42, the heads 102 are adjustable to accommodate different widths of tape, as can be readily observed.

Obviously many modifications and variations of the present invention are possible in the light of the above teachings. It is, therefore, to be understood that within the scope of the appended claims, the invention may be practiced otherwise than as specifically described.

What is claimed as the invention is:

1. A device for connecting overlapped ends of a strip comprising a clamping assembly and a heating means, said clamping assembly including a pair of plates, said plates each having at least one hole therein, the hole of one plate being arranged to mate with the hole of the other plate when said plates are in superimposed relationship, and said heating means including a heating iron having at least one pin depending from one face thereof, said pin being insertable through said mating holes in said clamping assembly when said heating means is superimposed over said clamping assembly, and electrical connecting means for connecting said heating means to a source of electrical energy.

2. The device of claim 1 wherein the clamping assembly includes lateral guide and stop means, said means comprising at least one pin depending from one of said plates adjacent one edge thereof and being receivable in a corresponding hole in the other of said plates when said plates are in superimposed relationship.

3. The device of claim 1 wherein the clamping assembly includes lateral guide and stop means, said means comprising at least one bracket mounted at one edge of one of said plates, a screw threaded shaft extending through a screw-threaded aperture in said bracket, and a head on said shaft adjustable toward and away from the corresponding edges of said plates by means of the screw threaded relationship between said shaft and said aperture.

References Cited in the file of this patent

UNITED STATES PATENTS

| | | |
|---|---|---|
| 2,244,550 | Chandler | June 3, 1941 |
| 2,545,243 | Rumsey | Mar. 13, 1951 |
| 2,668,403 | Rumsey | Feb. 9, 1954 |